(12) United States Patent
Takala et al.

(10) Patent No.: US 6,793,816 B1
(45) Date of Patent: Sep. 21, 2004

(54) EQUIPMENT FOR THE LEACHING OF SOLID MATTER FROM SLUDGE

(75) Inventors: Heikki Takala, Pori (FI); Yrjö Oinonen, Kokkola (FI); Kurt Höglund, Pietarsaari (FI)

(73) Assignee: Outokumpu Oyj, Espoo (FI)

( * ) Notice: Subject to any disclaimer, the term of this patent is extended or adjusted under 35 U.S.C. 154(b) by 96 days.

(21) Appl. No.: 10/048,678

(22) PCT Filed: Aug. 10, 2000

(86) PCT No.: PCT/FI00/00682

§ 371 (c)(1),
(2), (4) Date: Jun. 6, 2002

(87) PCT Pub. No.: WO01/12308

PCT Pub. Date: Feb. 22, 2001

(30) Foreign Application Priority Data

Aug. 12, 1999 (FI) .................................................. 991719

(51) Int. Cl.[7] .................................................. C02F 1/72
(52) U.S. Cl. ...................... 210/219; 210/194; 210/220; 261/93; 266/101; 366/102; 366/327.1
(58) Field of Search .................................................. 210/629, 721, 210/738, 758, 194, 219, 220, 765; 261/93; 366/102–104, 327.1; 266/101

(56) References Cited

U.S. PATENT DOCUMENTS

| 3,236,744 | A | * | 2/1966 | Yamaha | 435/295.1 |
|---|---|---|---|---|---|
| 4,058,481 | A | * | 11/1977 | Futai et al. | 516/115 |
| 4,256,839 | A | * | 3/1981 | Solomons et al. | 435/295.1 |
| 4,548,765 | A | * | 10/1985 | Hultholm et al. | 261/93 |
| 4,571,090 | A | * | 2/1986 | Weetman et al. | 366/270 |
| 4,648,973 | A | | 3/1987 | Hultholm et al. | 210/629 |
| 4,729,788 | A | * | 3/1988 | Hutchins et al. | 423/27 |
| 4,832,848 | A | | 5/1989 | Velebil et al. | 210/617 |
| 4,955,482 | A | * | 9/1990 | Elmore et al. | 209/17 |
| 5,006,320 | A | * | 4/1991 | Reid et al. | 423/150.5 |
| 5,244,603 | A | * | 9/1993 | Davis | 261/87 |
| 5,536,875 | A | * | 7/1996 | Roby et al. | 562/412 |
| 5,925,290 | A | * | 7/1999 | Hills | 261/36.1 |
| 6,576,041 | B2 | * | 6/2003 | Cole | 75/744 |

* cited by examiner

Primary Examiner—Peter A. Hruskoci
(74) Attorney, Agent, or Firm—Morgan & Finnegan, LLP

(57) ABSTRACT

The present invention concerns equipment for the leaching of solid matter from a sludge with the aid of a gas containing oxygen, the said equipment comprising a tall reactor (1) equipped with a central pipe (2) and from the reactor bottom (3), an upward-directed double-action mixer (5). The mixer is situated in the vicinity of the lower edge of the central pipe: the upper blades (13) of the mixer produce a downward suction flow from the central pipe, and the lower blades (14) disperse the gas to be fed into the sludge in the form of small bubbles, thereby preventing the solid matter from settling to the bottom of the reactor.

10 Claims, 2 Drawing Sheets

EQUIPMENT FOR THE LEACHING OF SOLID MATTER FROM SLUDGE

Figure 1:
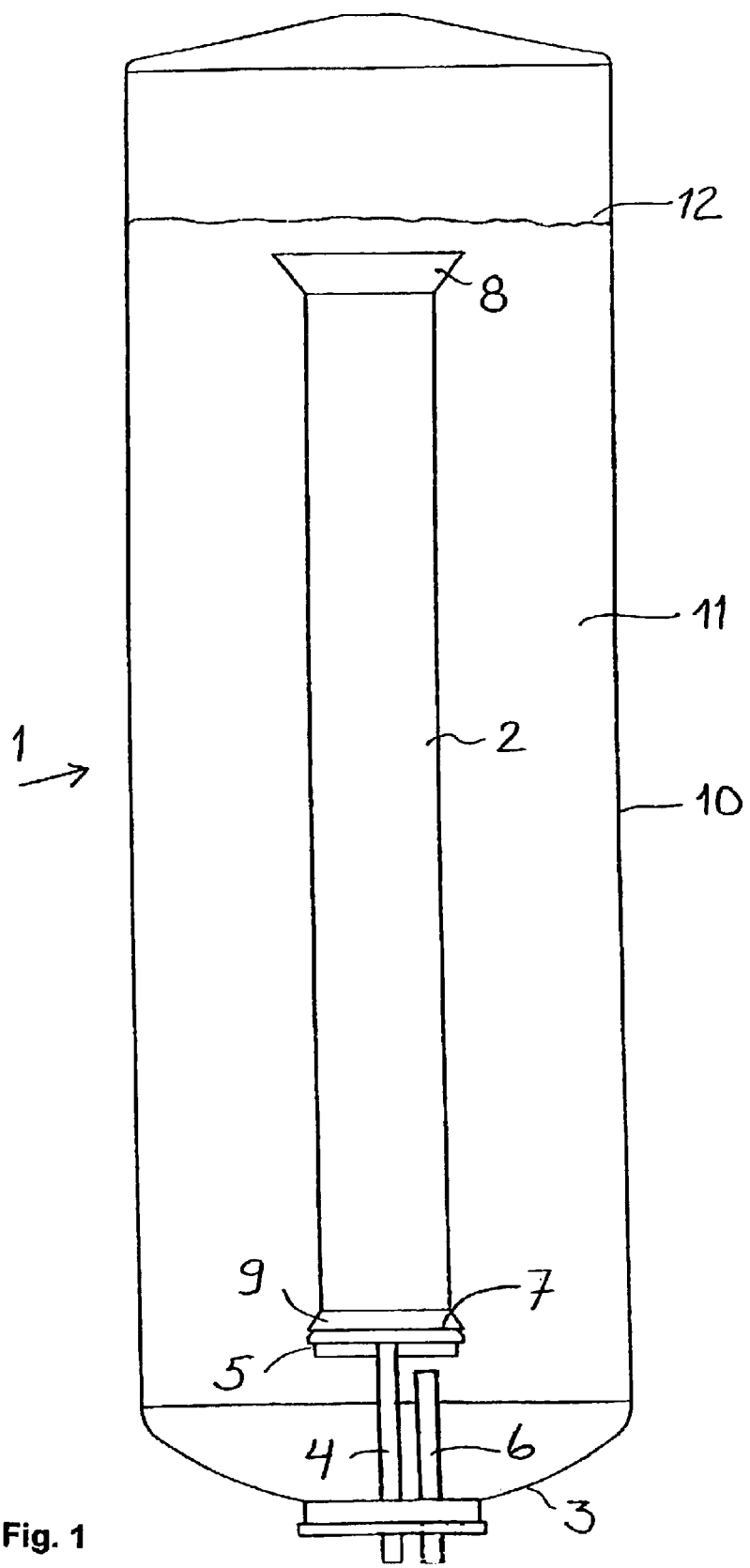

The present invention concerns equipment for the leaching of solid matter from a sludge with the aid of a gas containing oxygen, the said equipment comprising a tall reactor equipped with a central pipe and an upward-directed double-action mixer at the bottom of the reactor. The mixer is situated in the vicinity of the lower edge of the central pipe: the upper blades of the mixer produce a downward suction flow from the central pipe and the lower blades disperse the gas to be fed into the sludge in the form of small bubbles, thereby preventing the solid matter from settling to the bottom of the reactor.

In leaching of a sludge containing solid matter, such as for example metal concentrate, it is important that the participatory oxygen in the leaching, being introduced in the form of oxygen or gas containing oxygen, must firstly dissolve into the solid-containing sludge, in order that the oxygen can participate in the leaching reactions of the solid matter. A tall reactor is used for the improvement of the dissolution of the oxygen, whereupon, as compared to normal atmospheric reactors, great hydrostatic pressure forms at the bottom of the reactor (1.5–3.0 atm, i.e. 0.15–0.30 MPa), due to which the oxygen dissolves well in the reaction solution and thereby catalyses the dissolution of the solid matter.

In the prior art it is known for example U.S. Pat. No. 4,648,973, wherein the equipment concerns a reactor with a height many times greater than its diameter, inside which is located a concentric pipe. The sludge is fed into the upper part of the central pipe, as is the oxygen. For recirculation of the sludge, the central pipe is equipped with a mixer suspended from the top downwards, which pumps the sludge down the central pipe and the sludge then passes up through the space between the reactor and the internal pipe.

The ratio between the diameters of the central pipe and outer pipe is between 0.4 and 0.85.

Now, the present invention being developed concerns an equipment that comprises a tall reactor for the leaching of solid matter from a sludge, such as metal concentrate. The height of the reactor is many times greater than its diameter and the reactor is equipped with a central pipe extending to the bottom part, a mixer being located in the vicinity of the lower part of the central pipe and a feeding member for gas containing oxygen. The shaft of the mixer extends upwards from the bottom of the reactor. The mixer itself consists of an essentially horizontal central plate, with curved blades fixed above It and essentially straight blades fixed underneath the plate. The blades located above the central plate produce a downward sucking flow of sludge from the central pipe and, with the aid of the blades below the plate, the gas containing oxygen to be fed into the lower at of the reactor is dispersed into the sludge in the form of small bubbles, thereby preventing the sludge from precipitating to the bottom of the reactor. The essential features of the present invention are laid out in the enclosed claims.

As mentioned above, it is essential to the equipment that the mixer is located in the immediate vicinity of the lower edge of the central pipe, whereby the cross-section area of the discharge orifice remaining between the central pipe and the mixer is less than half the cross-section area of the central pipe, preferably at most one third of the cross-section area of the pipe. Thus the flow rate, from the central pipe, of the downward-flowing sludge increases at least twofold in comparison to the flow rate taking place in the central pipe. The nearer the mixer is located to the lower end of the pipe, the better the suction building up to the central pipe. In practice the limit is set by the tolerances, which result from the bending of the shaft and from the flexibility and dimensioning of the other parts. At the aforementioned cross-sectional area ratio, such a flow rate is achieved that the downward-directed solution flow is faster than the climbing rate of the gas bubbles, and the upward flow rate of the solution in the casing of the reactor is greater than the settling rate of the particles of solid matter.

The mixer used in the method according to the invention is of double-action, it is formed of two parts having an essentially horizontal plate between them. Curved blades are fixed above the horizontal plate which suck sludge downward in the central pipe. The blades fixed underneath the horizontal plate form a straight-bladed turbine mixer. As the gas containing oxygen is fed underneath the mixer installed in the bottom part of the reactor, the lower part of the mixer disperses the feed gas into very small bubbles, thus assisting the dissolution of the gas into the sludge. As the gas is fed into the sludge at the bottom part of the reactor, the gas bubbles moving with the sludge flow have as long a residence and reaction time in the sludge as possible, before they reach the surface or descend with the flow to be recirculated through the central pipe.

Figure 2:
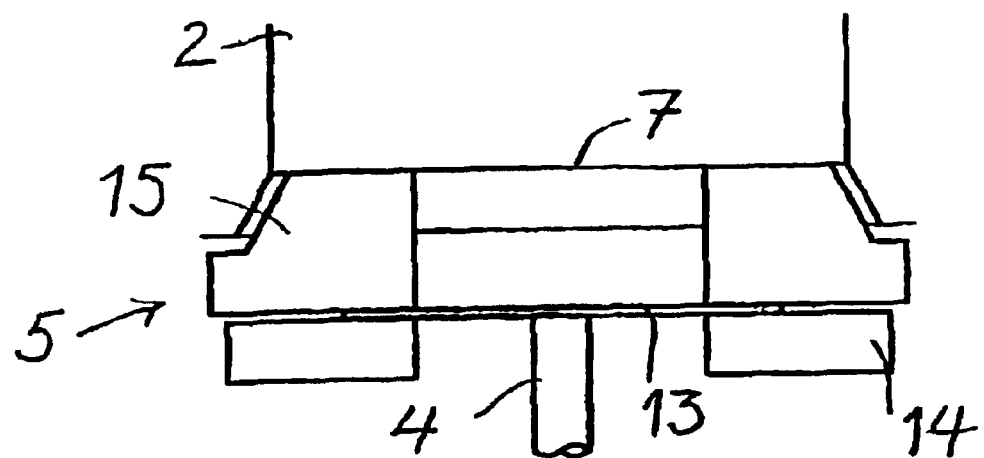
Figure 3:
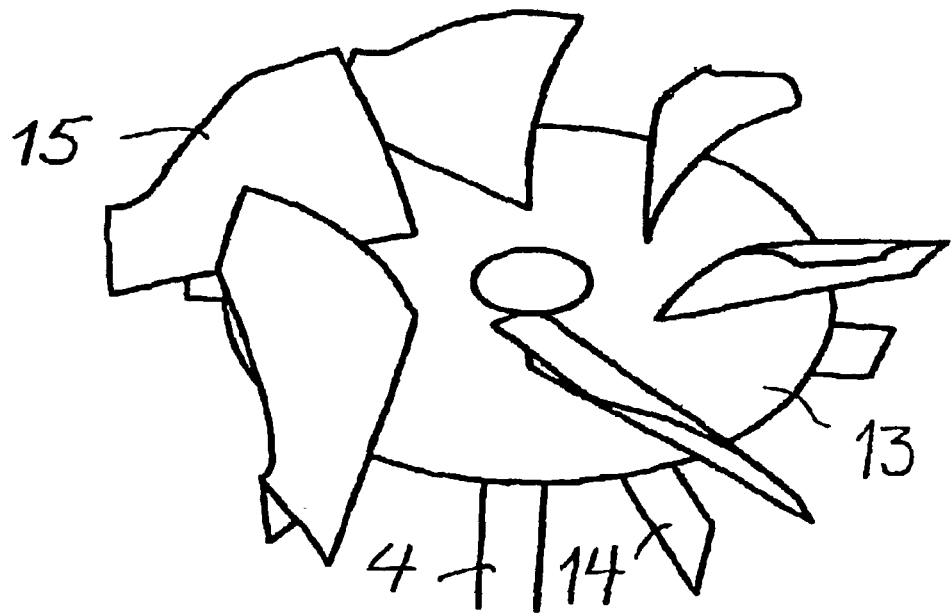

The equipment according to the present invention is explained in more detail with the aid of the enclosed figures, wherein FIG. 1 shows a vertical section of the reactor, in FIG. 2 a vertical section of the reactor is shown at the point of the central pipe and mixer, and FIG. 3 shows a three-dimensional picture of the reactor mixer.

For the leaching of sludge containing solid matter, FIG. 1 shows a tubular reactor 1, equipped with a concentric central pipe 2, which extends to the bottom part of the reactor. The distance of the central pipe from the reactor bottom is at range between 0.2–1.0 times the reactor diameter preferably between 0.3–0.5. The surface area ratio between the central pipe and the casing of the reactor surrounding it is below 0.1. Upward from a reactor bottom 3 is a mixer 5 supported by its shaft 4, and a feed member 6 for gas containing oxygen. As the inlet of the mixer shaft is in the lower part of the reactor, the shaft can be made to be as short and as sturdy as is possible.

The mixer is concentric with the pipe 2 and is located in very close proximity to the lower edge 7 of the central pipe. As seen in the figure, the central pipe 2 can be equipped at the upper and lower ends with conical extensions B and 9. According to the figure the mixer can be placed partly inside the central pipe. The annular space between reactor walls 10 and central pipe 2 can be designated as a casing 11. When necessary the lower part of the central pipe can be equipped with baffles (not illustrated). The sludge feed to the reactor can be done in a conventional manner for example to the central pipe and the solution can be removed for example as overflow, or the sludge can be preferable fed and discharged via its own means under a sludge surface 12. The inlet and outlet means are not illustrated in more detail in the figure.

As can be seen from FIGS. 2 and 3, the mixer comprises the mixer shaft 4, to which is fixed a horizontal plate 12, below which are attached straight lower blades 13 and above which are attached curved upper blades 14. The horizontal plate of the mixer impedes the flow of sludge from above the mixer to below it and vice versa. The horizontal plate can be circular or angular. Both the lower blades 13 and upper blades 14 are fixed to the horizontal plate 12 of the mixer in an essentially vertical manner. The lower blades are nearly rectangular and their task is to disperse the oxygen gas fed underneath the mixer as well as possible into the sludge and to bring about a vertically rotating flow at the bottom of the reactor, thereby preventing the solid matter contained in the sludge from settling to the bottom of the reactor. A well-mixed area, of a height about the same as the diameter of the reactor, thus forms at the bottom part of the reactor.

The lower parts of the upper blades are preferably of rectangular form, but the upper part smoothly tapered. The curved upper blades bring about the downward flow in the central pipe and the lower blades the upward return flow to the casing 11 of the reactor, in other words between walls 10 and central pipe 2. In FIG. 2 it can also be seen that in this case the mixer is installed at such a height that upper blades 14 partly extend into the inside of the central pipe.

The benefits gained from the equipment according to the present invention can be listed among the following facts: The mixing efficiency required is lower than conventionally, as the most efficient mixing takes place only at the bottom part of the reactor. Thanks to the double-action mixer, only one mixer is needed for the whale reactor, which both disperses the oxygen and circulates the solution. The inlet of the mixer shaft through the bottom allows the shaft to be short.

What is claimed is:

1. Equipment for leaching of a sludge containing solid matter aided by a gas containing oxygen, the equipment comprising a tubular reactor, with a height greater than its diameter and which is equipped with a concentric central pipe and a double-action mixer having upper blades and lower blades, the mixer supported by a shaft that extends upwards from the bottom of the reactor, the central pipe of the reactor extending to the bottom part of the reactor, the shaft having an inlet that is at the bottom part of the reactor, the mixer being located in the immediate vicinity of the lower edge of the central pipe, the upper part of the mixer being situated inside the central pipe, the upper blades of the mixer capable of producing a downward suction flow from the central pipe and the lower blades of the mixer capable of dispersing the gas into the sludge in the form of small bubbles to prevent solid matter in the sludge from settling to the bottom of the reactor, the flow cross-section area remaining between the mixer and the central pipe adjusted to be less than half of the flow cross-section area in the central pipe, and a feeding member for gas containing oxygen extending underneath the bottom of the mixer.

2. Equipment according to claim 1, the double-action mixer comprises a horizontal plate, under which are fixed, essentially vertical lower blades and above which are fixed curved upper blades.

3. Equipment according to claim 2, the lower blades are essentially rectangular in form.

4. Equipment according to claim 2, wherein the lower part of the upper blades are essentially rectangular in form with a smoothly tapered upper part.

5. Equipment according to claim 1, wherein the lower edge of the central pipe is at a height from the reactor bottom which is between 0.3–0.5 times that of the diameter of the reactor.

6. Equipment according to claim 1, wherein the flow cross-section area remaining between the mixer and the central pipe is adjusted to be at most one third of the flow cross-section area in the central pipe.

7. Equipment according to claim 1, wherein the lower part of the central pipe is equipped with a conical extension.

8. Equipment according to claim 1, wherein the upper part of the central pipe is equipped with a conical extension.

9. Equipment according to claim 1, wherein the lower edge of the central pipe is at a height from the reactor bottom, which is 0.2–1.0 times that of the diameter of the reactor.

10. Equipment according to claim 1, wherein the cross-section ratio of the central pipe and its surrounding reactor casing is under 0.1.

* * * * *